United States Patent [19]
Choi

[11] Patent Number: 5,684,537
[45] Date of Patent: Nov. 4, 1997

[54] METHOD OF CALCULATING DISCRETE COSINE TRANSFORM AT HIGH SPEED

[76] Inventor: Byung Ho Choi, 102-79, Kumam 2-dong, Jeonju-si, Junrabuk-do, Rep. of Korea

[21] Appl. No.: 762,452

[22] Filed: Dec. 9, 1996

Related U.S. Application Data

[63] Continuation of Ser. No. 175,554, Dec. 30, 1993, abandoned.

[30] Foreign Application Priority Data

Dec. 30, 1992 [KR] Rep. of Korea ............................. 26568

[51] Int. Cl.$^6$ .................................. H04N 7/32; H04N 7/30
[52] U.S. Cl. .......................... 348/403; 348/390; 348/384; 364/725; 364/726
[58] Field of Search ........................... 348/403, 390, 348/384, 412, 395; 358/400, 540; 364/725, 726; H04N 7/137, 7/32, 7/30

[56] References Cited

U.S. PATENT DOCUMENTS

| | | | |
|---|---|---|---|
| 4,602,350 | 7/1986 | Gray | 364/724 |
| 4,604,721 | 8/1986 | Gray | 364/726 |
| 4,646,256 | 2/1987 | Bracewell | 364/725 |
| 4,691,329 | 9/1987 | Juri et al. | 348/403 |
| 4,797,847 | 1/1989 | Duhamel | 364/725 |
| 4,999,705 | 3/1991 | Puri | 348/412 |
| 5,126,962 | 6/1992 | Chiang | 364/725 |
| 5,257,213 | 10/1993 | Kim et al. | 364/725 |
| 5,299,025 | 3/1994 | Shirasawa | 358/400 |
| 5,331,584 | 7/1994 | Kitsuki et al. | 364/725 |
| 5,394,349 | 2/1995 | Eddy | 364/725 |

OTHER PUBLICATIONS

"An Efficient Prime-Factor Algorithm for the Discrete Cosine Transform and Its Hardware Implementations", IEEE, 1993.

"Input and Output Index Mappings for a Prime-Factor-Decomposed Computation of Discrete Cosine Transform", Byeong Gi Lee, IEEE, pp. 237–244, Feb. 1989.

"Fast Algorithms for Computing the Discrete Cosine Transform", Chen et al, IEEE, pp. 185–190, Oct. 26, 1989, vol. 25.

"A General Index Mapping Technique for Array Reconfiguration", DiStante et al, IEEE, pp. 559–563, 1988.

"Prime number DFT computation via parallel circular convolvers", Jones, IEE Proceeding, vol. 137, Pt. F, No. 3, Jun. 90.

*Primary Examiner*—Amelia Au
*Assistant Examiner*—Vu Le
*Attorney, Agent, or Firm*—Fish & Richadson P.C.

[57] ABSTRACT

A method of calculating a discrete cosine transform at a high speed, comprising the input mapping step of mapping one-dimensional input data into three-dimensional input data, the three-dimensional derivation step of deriving a three-dimensional discrete cosine transform calculation expression from a one-dimensional discrete cosine transform calculation expression using a plurality of mapping functions to transform the three-dimensional input data into three-dimensional output data, and the output mapping step of mapping the three-dimensional output data into a one-dimensional output data. According to the invention, the number of multiplications is significantly reduced as compared with other algorithms, resulting in an increase in the DCT calculation speed.

2 Claims, 6 Drawing Sheets

FIG.1a

INPUT N1'N2'N3: 2'3'5

|  |  | n3 = 0 |  |  | n3 = 1 |  |  | n3 = 2 |  |  | n3 = 3 |  |  | n3 = 4 |  |
|---|---|---|---|---|---|---|---|---|---|---|---|---|---|---|---|---|
| n2\n1 |  | 0 | 1 | 2 | 0 | 1 | 2 | 0 | 1 | 2 | 0 | 1 | 2 | 0 | 1 | 2 |
| 0 |  | 0 | 10 | 20 | 6 | 16 | 26 | 12 | 22 | 28 | 18 | 28 | 22 | 24 | 26 | 16 |
| 1 |  | 15 | 25 | 25 | 21 | 29 | 19 | 27 | 23 | 13 | 27 | 17 | 7 | 21 | 11 | 1 |
| 0 |  | 0 | 10 | 20 | 6 | 16 | 26 | 12 | 22 | 28 | 18 | 28 | 22 | 24 | 26 | 16 |
| 1 |  | 15 | 5 | 5 | 9 | 1 | 11 | 3 | 7 | 17 | 3 | 13 | 23 | 9 | 19 | 29 |
| 0 |  | 0 | 10 | 20 | 6 | 4 | 14 | 12 | 2 | 8 | 18 | 8 | 2 | 24 | 14 | 4 |
| 1 |  | 15 | 25 | 25 | 9 | 19 | 29 | 3 | 13 | 23 | 3 | 7 | 17 | 9 | 1 | 11 |
| 0 |  | 0 | 10 | 20 | 6 | 4 | 14 | 12 | 2 | 8 | 18 | 8 | 2 | 24 | 14 | 4 |
| 1 |  | 15 | 5 | 5 | 21 | 11 | 1 | 27 | 17 | 7 | 27 | 23 | 13 | 21 | 29 | 19 |

F I G.1b

INPUT N1,N2,N3:

| | |
|---|---|
| (0,0,0) : 0 | (0,0,0) : 0 |
| (1,1,1) : 1 | (1,0,0) : 29 |
| (1,2,2) : 2 | (0,1,0) : 19 |
| (0,2,2) : 3 | (1,1,0) : 10 |
| (0,1,4) : 4 | (0,2,0) : 20 |
| (1,0,4) : 5 | (1,2,0) : 9 |
| (1,0,3) : 6 | (0,0,1) : 11 |
| (0,1,2) : 7 | (1,0,1) : 18 |
| (0,2,1) : 8 | (0,1,1) : 28 |
| (1,2,0) : 9 | (1,1,1) : 1 |
| (1,1,0) : 10 | (0,2,1) : 8 |
| (0,0,1) : 11 | (1,2,1) : 21 |
| (0,0,2) : 12 | (0,0,2) : 12 |
| (1,1,3) : 13 | (1,0,2) : 17 |
| (1,2,4) : 14 → | (0,1,2) : 7 |
| (0,2,4) : 15 | (0,1,2) : 22 |
| (0,1,3) : 16 | (0,2,2) : 27 |
| (1,0,2) : 17 ⇒ | (1,2,2) : 2 |
| (1,0,1) : 18 | (0,0,3) : 23 |
| (0,1,0) : 19 | (1,0,3) : 6 |
| (0,2,0) : 20 | (0,1,3) : 16 |
| (1,2,1) : 21 | (1,1,3) : 13 |
| (1,1,2) : 22 | (0,2,3) : 3 |
| (0,0,3) : 23 | (1,2,3) : 26 |
| (0,0,4) : 24 | (0,0,4) : 24 |
| (1,1,4) : 25 | (1,0,4) : 5 |
| (1,2,3) : 26 | (0,1,4) : 4 |
| (0,2,2) : 27 | (1,1,4) : 25 |
| (0,1,1) : 28 | (0,2,4) : 15 |
| (1,0,0) : 29 | (1,2,4) : 14 |

F I G.1c

|  | SECOND DIMENSIONAL PFA | | THIRD DIMENSIONAL PFA | |
|---|---|---|---|---|
| N | N1N2 | MULTIPLEXING NO | N1N2N3 | MULTIPLEXING NO |
| 12 | 3*4 | 23 | 1*3*4 | 23 |
| 30 | 5*6 | 93 | 2*3*5 | 83 |
| 42 | 6*7 | 171 | 2*3*7 | 157 |
| 60 | 5*12 | 281 | 3*4*5 | 211 |
| 84 | 7*12 | 475 | 3*4*7 | 376 |

F I G.2a

INPUT N1,N2,N3:2,2,2

|  | n3 = 0 | | n3 = 1 | |
|---|---|---|---|---|
| n2\n1 | 0 | 1 | 0 | 1 |
| 0 | 0 | 4 | 1 | 5 |
| 1 | 2 | 6 | 3 | 7 |
| 0 | 0 | 4 | 1 | 5 |
| 1 | 6 | 2 | 7 | 3 |
| 0 | 0 | 4 | 7 | 3 |
| 1 | 2 | 6 | 1 | 5 |
| 0 | 0 | 4 | 7 | 3 |
| 1 | 2 | 6 | 1 | 5 |
| n2\n1 | 0 | 1 | 0 | 1 |
| 0 | 0 | 4 | 1 | 5 |
| 1 | 2 | 6 | 7 | 3 |

INPUT N1,N2,N3:2,2,2

| | |
|---|---|
| (0,0,0) : 0 | (0,0,0) : 0 |
| (1,1,1) : 1 | (1,0,0) : 3 |
| (0,1,1) : 2 → | (0,1,0) : 6 |
| (1,0,0) : 3 | (1,1,0) : 5 |
| (0,0,1) : 4 | (0,0,1) : 4 |
| (1,1,0) : 5 → | (1,0,1) : 7 |
| (0,1,0) : 6 | (0,1,1) : 2 |
| (1,0,1) : 7 | (1,1,1) : 1 |

F I G.2d $x(0,0,0) \longrightarrow X(0)$ $x(1,0,0) \longrightarrow X(3)$ $x(0,1,0) \longrightarrow X(6)$ $x(1,1,0) \longrightarrow X(5)$ $x(0,0,1) \longrightarrow X(4)$ $x(1,0,1) \longrightarrow X(7)$ $x(0,1,1) \longrightarrow X(2)$ $x(1,1,1) \longrightarrow X(1)$

METHOD OF CALCULATING DISCRETE COSINE TRANSFORM AT HIGH SPEED

This application is a continuation of U.S. application Ser. No. 08/175,554, filed Dec. 30, 1993, now abandoned.

BACKGROUND OF THE INVENTION

The present invention relates in general to a video data processing compression method for compressing video information in video data processing systems such as a high definite television receiver, and more particularly to a method of calculating a discrete cosine transform (referred to hereinafter as DCT) at a high speed by performing a three-dimensional expansion of the video information using a prime factor algorithm (referred to hereinafter as PFA) and a common factor algorithm (referred to hereinafter as CFA).

This invention has the effect that a high speed performance of DCT is made possible by deriving a three-degree calculation formula from a one-degree calculation formula of a one-dimension DCT and decreasing the number of operations performed on each pixel data and thereby minimizing the IC chip capacity required due to a reduction of the multipliers required. the mappling and calculation functions of this invention using a high speed performance of DCT are carried out by utilizing an IC chip. The input and output pixel data discussed are representative of video signals which are compressed when processed according to method described herein.

A DCT is a linear-transformation which transforms every input pixel in one block to a pixel block with a new type of separate combined linear pixel.

That is to say, in a DCT, a digital data in an time domain is, after a performance of DCT, transformed to a digital data in a frequency domain so that an energy compaction takes place in a low frequency region.

Generally, among DCT fast algorithms, the PFA is to expand one-dimensional video information into two-dimensional video information. Namely, the PFA performs a DCT calculation by mapping one-dimensional input data $X(n)$ into two-dimensional input data $X(n_1,n_2)$. The PFA includes the input mapping step of mapping the one-dimensional input data into the two-dimensional input data, the step of substituting the mapped data at the input mapping step for the DCT calculation to expand $\cos\theta$ as a mathematical DCT kernel into $\cos\theta_1 \cos\theta_2$, and the output mapping step of mapping coefficients calculated at the above step into output data.

The mapping of the one-dimensional input data (the video information to be compressed) into the two-dimensional input data based on the PFA has the effect of reducing the number of multiplications. For example, expanding a block size N into a two-degree domain, $N=N_1 N_2$. As a result, the number of multiplications is reduced from $N^2$ to $N(N_1+N_2)$. In this case, all of duplicated calculations and multiplications by "0" or "1" are deleted.

The above-mentioned conventional DCT calculating method is to mathematically derive a two-dimensional DCT calculation expression from a one-dimensional DCT calculation expression to reduce the number of multiplications. The one-dimensional DCT calculation expression is as follows:

$$X(n) = 2/N \cdot e(n) \sum_{k=0}^{N-1} x(k) \cdot \cos[\pi(2k+1)n/2N]$$

$n = 0, 1, \ldots, N-1$ $$x(k) = \sum_{n=0}^{N-1} e(n) \cdot x(n) \cdot \cos[\pi(2k+1)n/2N]$$

$k = 0, 1, \ldots, N-1$ where, $e(n) = \begin{bmatrix} 1/\sqrt{2}, & \text{if } n=0 \\ 1, & \text{otherwise} \end{bmatrix}$ $N = N_1, N_2$ $N_1$ and $N_2$ are relative prime integers.

The two-dimensional DCT calculation expression is as follows:

$$X(k_1, k_2) =$$

$$\sum_{n_2=0}^{N_2-1} \left\{ \sum_{n_1=0}^{N_1-1} X(n_1, n_2) \cdot \cos[\pi(2k_1+1)n_1/2N_1] \cdot \cos[\pi(2k_2+1)n_2/2N_2] \right\}$$

$K_1 = 0, 1, \ldots, N_1 - 1$
$K_2 = 0, 1, \ldots, N_2 - 1$

This procedure derived by the two mapping steps, the input and output mapping steps.

An input mapping function is given as follows:

$f(n_1,n_2) = \lceil n_1N_2+n_2N_1$, if $n_1N_2+n_2N_1 < N$ $\lfloor 2N-(n_1N_2+n_2N_1)$, otherwise $f(n_1,n_2)=|n_1N_2-n_2N_1|$ An output mapping function is given as follows:

$k_1=k_1$, if $k_1<N_1 2N_1-1-k_1$, otherwise $k_2=k_2$, if $k_2<N_2 2N_2-1-k_2$ otherwise.

In expanding the two-dimensional input data into the output data of $N=N_1N_2$ according to the conventional DCT calculating method, a calculable block size is limited to 6 ($2\times3$), 12 ($3\times4$), 20 ($4\times5$) and etc. because the prime factors $N_1$ and $N_2$ are relative primes. For this reason, the conventional DCT calculating method has a disadvantage in that it is impossible to perform the calculation with respect to a block size 8 which is an international standard. Also, because the DCT calculation is performed depending on the two-dimensional expansion, the number of the multiplications is not so reduced as expected.

SUMMARY OF THE INVENTION

Therefore, the present invention has been made in view of the above problems, and it is an object of the present invention to provide a method of calculating a DCT at a high speed in which cosine as a mathematical DCT kernel is expanded into a three-cosine multiplication expression ($\cos A \cdot \cos B \cdot \cos C$), resulting in a significant reduction in the number of multiplications necessary to the DCT calculation.

It is another object of the present invention to provide a method of calculating a DCT at a high speed in which a three-dimensional CFA is performed to overcome a limitation in a calculable block size, so that the DCT calculation can be performed even with respect to an international standard block size.

In accordance with the present invention, the above and other objects can be accomplished by a provision of a method of calculating a discrete cosine transform at a high speed, comprising the input mapping step of mapping one-dimensional input data into three-dimensional input data; the three-dimensional derivation step of deriving a three-dimensional discrete cosine transform calculation expression from a one-dimensional discrete cosine transform calculation expression using a plurality of mapping functions to transform said three-dimensional input data into three-dimensional output data; and the output mapping step of mapping said three-dimensional output data into a one-dimensional output data.

BRIEF DESCRIPTION OF THE DRAWINGS

The above and other objects, features and advantages of the present invention will be more clearly understood from the following detailed description taken in conjunction with the accompanying drawings, in which:

FIG. 1A is a view illustrating an input mapping table for a PFA in accordance with the present invention;

FIG. 1B is a view illustrating an output mapping table for the PFA in accordance with the present invention;

FIG. 1C is a view illustrating a table for the comparison of the number of multiplications in a two-dimensional PFA and a three-dimensional PFA in accordance with the present invention;

FIG. 2A is a view illustrating an input mapping table for a CFA in accordance with the present invention;

FIG. 2D is a view illustrating a signal flow graph for the output mapping of the CFA.

DETAILED DESCRIPTION OF THE INVENTION

Figures 2B, 2C:
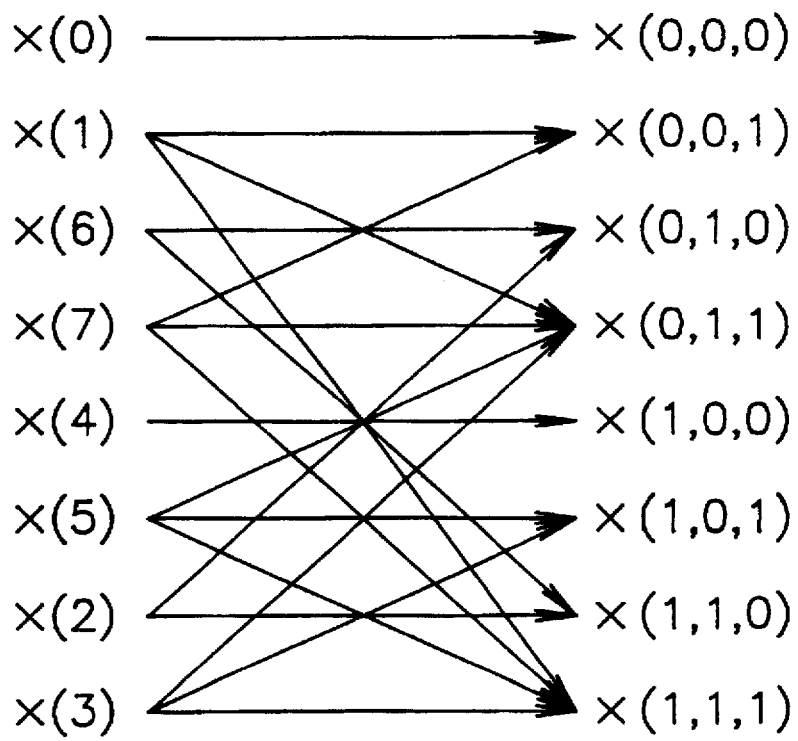
FIG. 2B is a view illustrating an output mapping table for the CFA in accordance with the present invention.
FIG. 2C is a view illustrating a signal flow graph for the input mapping of the CFA.

A DCT prime factor algorithm (PFA) and a DCT common factor algorithm (CFA) are proposed by a method of calculating a DCT at a high speed in accordance with the present invention. The proposed algorithms are mathematical algorithms for expanding cosine as a mathematical DCT kernel into a three-cosine multiplication expression (for example, cosA·cosB·cosC).

The expansion of the DCT kernel cosine into the three-cosine multiplication expression has the effect of significantly reducing the number of multiplications necessary to the DCT calculation and thus enabling the fast calculation.

Among general fast discrete fourier transform algorithms, the PFA can simply transform a kernel into a three-factor multiplication expression by means of replacement because the kernel is an exponential term. However, it is difficult to simply transform the cosine term as the DCT kernel into the three-cosine multiplication expression. For this reason, a main feature of the present invention is to derive the three-cosine multiplication expression from the DCT kernel through a mathematical expanding procedure using mapping.

The three-dimensional PFA proposed by the present invention is a DCT calculating algorithm for a block size N which is in the form of $N_1 \times N_2 \times N_3$ (relatively prime number having no common measure other than 1). For example, the three-dimensional PFA can perform the DCT calculation with respect to a block size N which is a multiplication of prime number such as 6 (1×2×3), 10 (1×2×5), 12 (1×3×4), ..., 30 (2×3×5) and etc.

First, expand the block size N into a three-prime factor multiplication as follows:

$$N = N_1 \times N_2 \times N_3 \tag{1}$$

DCT and IDCT calculation expressions can be given by a DCT definition as follows:

$$X(n) = 2/N \cdot e(n) \sum_{k=0}^{N-1} x(k) \cdot \cos[\pi(2k+1)n/2N] \tag{2}$$
$$n = 0, 1, \ldots, N-1$$

$$x(k) = \sum_{n=0}^{N-1} e(n) \cdot x(n) \cdot \cos[\pi(2k+1)n/2N] \tag{3}$$
$$k = 0, 1, \ldots, N-1$$

where, $e(n) = \begin{bmatrix} 1/\sqrt{2}, & \text{if } n = 0 \\ 1, & \text{otherwise} \end{bmatrix}$ Here, the DCT and IDCT calculation expressions have the inverted relation to each other because of an orthogonal transform. The three-dimensional PFA is performed using the above equation (2). A main feature of the above algorithm is to reduce the number of multiplications by expanding $\cos[\pi(2k+1)n/2N]$ as the DCT kernel as follows:

$$\cos [\pi(2k_1+1)n/2N_1] \times \cos [\pi(2k_2+1)n/2N_2] \times \cos [\pi(2k_3+1)n/2N_3]$$

Namely, the above equation (2) is expanded into the following equation (4):

$$x(k_1, k_2, k_3) = \begin{bmatrix} \sum_{n_3=0}^{N_3-1} \sum_{n_2=0}^{N_2-1} \sum_{n_1=0}^{N_1-1} X(n_1, n_2, n_3) \cdot \begin{array}{l} \cos[\pi(2k_1+1)n_1/2N_1] \\ \cos[\pi(2k_2+1)n_2/2N_2] \\ \cos[\pi(2k_3+1)n_3/2N_3] \end{array} \end{bmatrix} \tag{4}$$

for $n_1, k_1 = 0, 1, 2, \ldots, N_1 - 1$
$n_2, k_2 = 0, 1, 2, \ldots, N_2 - 1$
$n_3, k_3 = 0, 1, 2, \ldots, N_3 - 1$ Input mapping is performed to map one-dimensional input data x(n) into three-dimensional input data $x(n_1, n_2, n_3)$, where, x(n): n=0, 1, ..., N−1

$x(n_1, n_2, n_3)$: $n_1$=0, 1, ..., $N_1$−1 $n_2$=0, 1, ..., $N_2$−1 $n_3$=0, 1, ..., $N_3$−1

The input mapping means that the n value corresponds for replacement for a mapping function. Also, the input mapping is performed to obtain the three-cosine multiplication. Derivation of the equation (4) from the equation (2) is obtained by classifying the input mapping into the following four cases:

$$fa(n_1, n_2, n_3) = 1-2N - (n_1N_2N_3 + n_2N_3N_1 + \tag{5}$$
$$n_3N_1N_2)| \text{ if } -3N < n_1N_2N_3 + n_2N_3N_1 + n_3N_1N_2 < -N$$
$$|n_1N_2N_3 + n_2N_3N_1 + n_3N_1N_2| \text{ if } -N < n_1N_2N_3 + n_2N_3N_1 + n_3N_1N_2 < N$$
$$|2N - (n_1N_2N_3 + n_2N_3N_1 + n_3N_1N_2)| \text{ if } N < n_1N_2N_3 + n_2N_3N_1 + n_3N_1N_2 < 3N$$

$$fb(n_1, n_2, n_3) = 1-2N - (n_1N_2N_3 + n_2N_3N_1 - n_3N_1N_2)| \text{ if } -3N < n_1N_2N_3 + n_2N_3N_1 - n_3N_1N_2 < -N$$
$$|n_1N_2N_3 + n_2N_3N_1 - n_3N_1N_2| \text{ if } -N < n_1N_2N_3 + n_2N_3N_1 - n_3N_1N_2 < N$$
$$|2N - (n_1N_2N_3 + n_2N_3N_1 - n_3N_1N_2)| \text{ if } N < n_1N_2N_3 + n_2N_3N_1 - n_3N_1N_2 < 3N$$

-continued $$fc(n_1,n_2,n_3) = |-2N - (n_1N_2N_3 - n_2N_3N_1 + n_3N_1N_2)| \text{ if } -3N < n_1N_2N_3 - n_2N_3N_1 + n_3N_1N_2 < -N$$
$$|n_1N_2N_3 - n_2N_3N_1 + n_3N_1N_2| \text{ if } -N < n_1N_2N_3 - n_2N_3N_1 + n_3N_1N_2 < N$$
$$|2N - (n_1N_2N_3 - n_2N_3N_1 + n_3N_1N_2)| \text{ if } N < n_1N_2N_3 - n_2N_3N_1 + n_3N_1N_2 < 3N$$

$$fd(n_1,n_2,n_3) = |-2N - (n_1N_2N_3 - n_2N_3N_1 - n_3N_1N_2)| \text{ if } -3N < n_1N_2N_3 - n_2N_3N_1 - n_3N_1N_2 < -N$$
$$|n_1N_2N_3 - n_2N_3N_1 - n_3N_1N_2| \text{ if } -N < n_1N_2N_3 - n_2N_3N_1 - n_3N_1N_2 < N$$
$$|2N - (n_1N_2N_3 - n_2N_3N_1 - n_3N_1N_2)| \text{ if } N < n_1N_2N_3 - n_2N_3N_1 - n_3N_1N_2 < 3N$$

The mapping functions in the above equations (5) have the following properties (verification omitted):

$$fa(n_1, n_2, n_3) = fa(N_1 - n_1, N_2 - n_2, N_3 - n_3) \quad (6)$$
$$fb(n_1, n_2, n_3) = fb(N_1 - n_1, N_2 - n_2, N_3 - n_3)$$
$$fc(n_1, n_2, n_3) = fc(N_1 - n_1, N_2 - n_2, N_3 - n_3)$$
$$fd(n_1, n_2, n_3) = fd(N_1 - n_1, N_2 - n_2, N_3 - n_3)$$

From the above equations (6), it can be seen that the n value calculated in each mapping function is a one-to-one mapped value. Sets $\Omega a$, $\Omega b$, $\Omega c$ and $\Omega d$ of the n values calculated by the mapping functions fa, fb, fc and fd can be expressed by the following equations (7):

$$\Omega a = \{n/n = fa(n_1, n_2, n_3), n_1 \in \Omega 1, n_2 \in \Omega 2, n_3 \in \Omega 3\} \quad (7)$$
$$\Omega b = \{n/n = fb(n_1, n_2, n_3), n_1 \in \Omega 1, n_2 \in \Omega 2, n_3 \in \Omega 3\}$$
$$\Omega c = \{n/n = fc(n_1, n_2, n_3), n_1 \in \Omega 1, n_2 \in \Omega 2, n_3 \in \Omega 3\}$$
$$\Omega d = \{n/n = fd(n_1, n_2, n_3), n_1 \in \Omega 1, n_2 \in \Omega 2, n_3 \in \Omega 3\}$$

The union of the sets $\Omega a$, $\Omega b$, $\Omega c$ and $\Omega d$ is $4\Omega$. The union signifies merely gathering the elements in the sets. Namely, the union of a set $\{1,2,3\}$ and a set $\{3,4,5\}$ is the same as a set $\{1,2,3,3,4,5\}$. Further, the union of the sets means that each of the elements $0, 1, 2, \ldots, N-1$ is present by four therein.

With these mapping properties, the equation (2) can be expanded into the following equation (8) by dividing the DCT calculation for each mapping function by 4 and then summing the results:

$$X(k) = 1/4 \sum_{n=\Omega a} x(n) \cdot \cos[\pi(2k+1)n/2N] + \quad (8)$$
$$1/4 \sum_{n=\Omega b} x(n) \cdot \cos[\pi(2k+1)n/2N] +$$
$$1/4 \sum_{n=\Omega c} x(n) \cdot \cos[\pi(2k+1)n/2N] +$$
$$1/4 \sum_{n=\Omega d} x(n) \cdot \cos[\pi(2k+1)n/2N]$$

Also, the mapping inputs can be expressed using sign factors s(n) as follows:

$$x_a(n_1, n_2, n_3) = s_a(n) x(n) \text{ in} = fa(n_1, n_2, n_3) \quad (9)$$
$$x_b(n_1, n_2, n_3) = s_b(n) x(n) \text{ in} = fb(n_1, n_2, n_3)$$
$$x_c(n_1, n_2, n_3) = s_c(n) x(n) \text{ in} = fc(n_1, n_2, n_3)$$
$$x_d(n_1, n_2, n_3) = s_d(n) x(n) \text{ in} = fd(n_1, n_2, n_3)$$

$$\text{for } s_a(n) = 1 \text{ if } -N < n_1N_2N_3 + n_2N_3N_1 + n_3N_1N_2 < N$$
$$-1 \text{ otherwise}$$

$$s_b(n) = 1 \text{ if } -N < n_1N_2N_3 + n_2N_3N_1 - n_3N_1N_2 < N$$
$$-1 \text{ otherwise}$$

$$s_c(n) = 1 \text{ if } -N < n_1N_2N_3 - n_2N_3N_1 + n_3N_1N_2 < N$$
$$-1 \text{ otherwise}$$

-continued
$$s_d(n) = 1 \text{ if } -N < n_1N_2N_3 - n_2N_3N_1 - n_3N_1N_2 < N$$
$$-1 \text{ otherwise}$$

Here, the minus sign appears because of a period functional property of cosine as follows:

$$\cos[\pi(2k+1)(2N-n)/2N] = -\cos[\pi(2k+1)n/2N]$$

The following equation (10) is obtained by substituting the four mapping functions $fa(n_1,n_2,n_3)$, $fb(n_1,n_2,n_3)$, $fc(n_1,n_2,n_3)$ and $fd(n_1,n_2,n_3)$ of the equation (9) for the n values in the equation (8):

$$X(k) = 1/4 \sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot \quad (10)$$
$$(n_1N_2N_3 + n_2N_3N_1 + n_3N_1N_2)/2N] +$$
$$x_b(n_1, n_2, n_3) \times \cos[\pi(2k+1)(n_1N_2N_3 - n_2N_3N_1 + n_3N_1N_2)/2N] +$$
$$x_c(n_1, n_2, n_3) \times \cos[\pi(2k+1)(n_1N_2N_3 + n_2N_3N_1 - n_3N_1N_2)/2N] +$$
$$x_d(n_1, n_2, n_3) \times \cos[\pi(2k+1)(n_1N_2N_3 - n_2N_3N_1 - n_3N_1N_2)/2N]$$

Here, all the mapping calculations with no correlation become 0 because the input values are not present. These can be expressed as follows:

$$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot \quad (11)$$
$$(n_1N_2N_3 - n_2N_3N_1 + n_3N_1N_2)/2N] = 0$$

$$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot$$
$$(n_1N_2N_3 + n_2N_3N_1 - n_3N_1N_2)/2N] = 0$$

$$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot$$
$$(n_1N_2N_3 - n_2N_3N_1 - n_3N_1N_2)/2N] = 0$$

$$\sum_{n_3=1}^{N_3-1} \sum_{n_2=1}^{N_2-1} \sum_{n_1=1}^{N_1-1} x_b(n_1, n_2, n_3) \times \cos[\pi(2k+1) \cdot$$
$$(n_1N_2N_3 + n_2N_3N_1 - n_3N_1N_2)/2N] = 0$$

$$\sum_{n_3=1}^{N_3-1} \sum_{n_2=1}^{N_2-1} \sum_{n_1=1}^{N_1-1} x_b(n_1, n_2, n_3) \times \cos[\pi(2k+1) \cdot$$
$$(n_1N_2N_3 + n_2N_3N_1 + n_3N_1N_2)/2N] = 0$$

$$\sum_{n_3=1}^{N_3-1} \sum_{n_2=1}^{N_2-1} \sum_{n_1=1}^{N_1-1} x_b(n_1, n_2, n_3) \times \cos[\pi(2k+1) \cdot$$
$$(n_1N_2N_3 - n_2N_3N_1 - n_3N_1N_2)/2N] = 0$$

$$\sum_{n_3=1}^{N_3-1} \sum_{n_2=1}^{N_2-1} \sum_{n_1=1}^{N_1-1} x_c(n_1, n_2, n_3) \times \cos[\pi(2k+1) \cdot$$
$$(n_1N_2N_3 + n_2N_3N_1 - n_3N_1N_2)/2N] = 0$$

$$\sum_{n_3=1}^{N_3-1} \sum_{n_2=1}^{N_2-1} \sum_{n_1=1}^{N_1-1} x_c(n_1, n_2, n_3) \times \cos[\pi(2k+1) \cdot$$
$$(n_1N_2N_3 + n_2N_3N_1 + n_3N_1N_2)/2N] = 0$$

$$\sum_{n_3=1}^{N_3-1} \sum_{n_2=1}^{N_2-1} \sum_{n_1=1}^{N_1-1} x_c(n_1, n_2, n_3) \times \cos[\pi(2k+1) \cdot$$
$$(n_1N_2N_3 - n_2N_3N_1 - n_3N_1N_2)/2N] = 0$$

-continued $$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot (n_1N_2N_3 + n_2N_3N_1 + n_3N_1N_2)/2N] = 0$$

$$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot (n_1N_2N_3 - n_2N_3N_1 + n_3N_1N_2)/2N] = 0$$

$$\sum_{n_3=1}^{N_3-1} \sum_{n_2=1}^{N_2-1} \sum_{n_1=1}^{N_1-1} x_a(n_1, n_2, n_3) \times \cos[\pi(2k+1) \cdot (n_1N_2N_3 + n_2N_3N_1 - n_3N_1N_2)/2N] = 0$$

The reason why the first three terms become 0 is because the mapping function fa substituted for the n value has no correlation in the DCT calculations for the input functions fb, fc and fd. Similarly, the remaining terms become 0 on the same reason. The inputs in the equation (10) can be tied up by the equations (11) as shown in the following equation (12):

$$X(k) = 1/4 \sum_{n_3=1}^{N_3-1} \sum_{n_2=1}^{N_2-1} \sum_{n_1=1}^{N_1-1} x(n_1, n_2, n_3) \times \tag{12}$$
$$\{\cos[\pi(2k+1)(n_1N_2N_3 + n_2N_3N_1 + n_3N_1N_2)/2N] +$$
$$\cos[\pi(2k+1)(n_1N_2N_3 - n_2N_3N_1 + n_3N_1N_2)/2N] +$$
$$\cos[\pi(2k+1)(n_1N_2N_3 + n_2N_3N_1 - n_3N_1N_2)/2N] +$$
$$\cos[\pi(2k+1)(n_1N_2N_3 - n_2N_3N_1 - n_3N_1N_2)/2N]\}$$

The three-cosine multiplication can be derived from the above equation (12) on the basis of a summing formula of a trigonometric function as follows:

$$\begin{aligned}
\cos(a+b+c) &= \cos(a+b)\cos(c) - \sin(a+b)\sin(c) \\
&= \{\cos(a)\cos(b) - \sin(a)\sin(b)\}\cos(c) - \\
&\quad \{\sin(a)\cos(b) + \cos(a)\sin(b)\}\sin(c) \\
&= \cos(a)\cos(b)\cos(c) - \sin(a)\sin(b)\sin(c) - \\
&\quad \sin(a)\cos(b)\sin(c) - \cos(a)\sin(b)\sin(c) \\
\cos(a-b+c) &= \cos(a-b)\cos(c) - \sin(a-b)\sin(c) \\
&= \{\cos(a)\cos(b) + \sin(a)\sin(b)\}\cos(c) - \\
&\quad \{\sin(a)\cos(b) - \cos(a)\sin(b)\}\sin(c) \\
&= \cos(a)\cos(b)\cos(c) + \sin(a)\sin(b)\sin(c) - \\
&\quad \sin(a)\cos(b)\sin(c) + \cos(a)\sin(b)\sin(c) \\
\cos(a+b-c) &= \cos(a+b)\cos(c) + \sin(a+b)\sin(c) \\
&= \{\cos(a)\cos(b) - \sin(a)\sin(b)\}\cos(c) + \\
&\quad \{\sin(a)\cos(b) + \cos(a)\sin(b)\}\sin(c) \\
&= \cos(a)\cos(b)\cos(c) - \sin(a)\sin(b)\sin(c) + \\
&\quad \sin(a)\cos(b)\sin(c) + \cos(a)\sin(b)\sin(c) \\
\cos(a-b-c) &= \cos(a-b)\cos(c) + \sin(a-b)\sin(c) \\
&= \{\cos(a)\cos(b) + \sin(a)\sin(b)\}\cos(c) + \\
&\quad \{\sin(a)\cos(b) - \cos(a)\sin(b)\}\sin(c) \\
&= \cos(a)\cos(b)\cos(c) + \sin(a)\sin(b)\sin(c) + \\
&\quad \sin(a)\cos(b)\sin(c) - \cos(a)\sin(b)\sin(c)
\end{aligned} \tag{13}$$

Summing the terms in the above equations (13), all the sine terms are deleted as in the following equation (14):

$$\cos(a+b+c) + \cos(a-b+c) + \cos(a+b-c) + \tag{14}$$
$$\cos(a-b-c) = 4\cos(a)\cos(b)\cos(c) \Rightarrow (¼)\{\cos(a+b+c) +$$
$$\cos(a-b+c) + \cos(a+b-c) + \cos(a-b-c)\} = \cos(a)\cos(b)\cos(c)$$

replacing a, b and c in the above equation (14) with $n_1N_2N_3$, $n_2N_3N_1$ and $n_3N_1N_2$, respectively, the cosine term in the equation (12) can be transformed into the following three-cosine multiplication:

$$\cos[\pi(2k+1)(n_1N_2N_3 + n_2N_3N_1 + n_3N_1N_2)/2N] + \tag{15}$$
$$\cos[\pi(2k+1)(n_1N_2N_3 - n_2N_3N_1 + n_3N_1N_2)/2N] +$$
$$\cos[\pi(2k+1)(n_1N_2N_3 + n_2N_3N_1 - n_3N_1N_2)/2N] +$$
$$\cos[\pi(2k+1)(n_1N_2N_3 - n_2N_3N_1 - n_3N_1N_2)/2N] =$$
$$\cos[\pi(2k+1)n_1/2N_1] \times \cos[\pi(2k+1)n_2/2N_2] \times \cos[\pi(2k+1)n_3/2N_3]$$

Then, substituting the above equation (15) for the equation (12), the three-cosine multiplication can be derived as follows:

$$X(k) = \sum_{n_3=0}^{N_3-1} \sum_{n_2=0}^{N_2-1} \sum_{n_1=0}^{N_1-1} X(n_1, n_2, n_3) \cdot \tag{16}$$
$$\cos[\pi(2k+1)n_1/2N_1] \cdot \cos[\pi(2k+1)n_2/2N_2] \cdot \cos[\pi(2k+1)n_3/2N_3]$$

for $n_1 = 0, 1, 2, \ldots, N_1 - 1$
$n_2 = 0, 1, 2, \ldots, N_2 - 1$
$n_3 = 0, 1, 2, \ldots, N_3 - 1$
$k = 0, 1, 2, \ldots, N - 1$ Output mapping is performed to map three-dimensional output data x(k1,k2,k3) into one-dimensional output data x(k), where, x(k): k=0, 1, ..., N−1
x(k1,k2,k3): k1=0, 1, ..., $N_1$−1 k2=0, 1, ..., $N_2$−1 k3=0, 1, ..., $N_3$−1

The output mapping can be expressed by the following equation (17):

$$k_1 = \begin{cases} k_a & \text{if } k_a < N_1 \\ 2N_1 - 1 - k_a & \text{otherwise} \end{cases} \tag{17}$$

$$k_2 = \begin{cases} k_b & \text{if } k_b < N_2 \\ 2N_2 - 1 - k_b & \text{otherwise} \end{cases}$$

$$k_3 = \begin{cases} k_c & \text{if } k_c < N_3 \\ 2N_3 - 1 - k_c & \text{otherwise} \end{cases}$$

where, $k_a = k$ modulo $2N_1$
$k_b = k$ modulo $2N_2$
$k_c = k$ modulo $2N_3$

Substituting the output mapping values $k_1$, $k_2$ and $k_3$ in the above equations (17) for k, the result is:

$$\cos[\pi(2k+1)n_1/2N_1] = \cos[\pi(2k_1+1)n_1/2N_1] \tag{18}$$
$$\cos[\pi(2k+1)n_2/2N_2] = \cos[\pi(2k_2+1)n_2/2N_2]$$
$$\cos[\pi(2k+1)n_3/2N_3] = \cos[\pi(2k_3+1)n_3/2N_3]$$

With the above result, the three-dimensional PFA result (19) proposed by the present invention can be derived from the equation (2):

$$X(k) = \sum_{n_3=0}^{N_3-1} \sum_{n_2=0}^{N_2-1} \sum_{n_1=0}^{N_1-1} X(n_1, n_2, n_3) \cdot \tag{19}$$
$$\cos[\pi(2k_1+1)n_1/2N_1] \cdot \cos[\pi(2k_2+1)n_2/2N_2] \cdot \cos[\pi(2k_3+1)n_3/2N_3]$$

-continued for $n_1 = 0, 1, 2, \ldots, N_1 - 1$
$n_2 = 0, 1, 2, \ldots, N_2 - 1$
$n_3 = 0, 1, 2, \ldots, N_3 - 1$
$k_1 = 0, 1, 2, \ldots, N_1 - 1$
$k_2 = 0, 1, 2, \ldots, N_2 - 1$
$k_3 = 0, 1, 2, \ldots, N_3 - 1$ FIG. 1A is a view illustrating an input mapping table for the PFA in the case where the block size N is 30 (2×3×5). In this drawing, the mapped values are obtained by substituting the variables $n_1$ (0,1), $n_2$ (1,2) and $n_3$ (0,1,2,3,4) for the four mapping functions fa, fb, fc and fd of the equations (5). In the union of the mapped values, each of the elements 0, 1, 2, 3, . . . , 29 of the resultant values is present by four.

FIG. 1B is a view illustrating an output mapping table for the PFA in the case where the block size N is 30 (2×3×5). In this drawing, the mapped values are obtained by substituting the output variables $k_1$ (0,1), $k_2$ (0,1,2) and $k_3$ (0,1,2,3,4) for the output mapping functions of the equations (17). The calculated results of the three-dimensional DCT are rearranged as shown in FIG. 1B.

FIG. 1C is a view illustrating a table for the comparison of the number of multiplications in the two-dimensional PFA and the three-dimensional PFA in accordance with the present invention. From this drawing, it can be seen that the multiplications required by the three-dimensional PFA are smaller in number than those required by the two-dimensional PFA. Therefore, in the case where the block size N is large, the number of multiplications in the present PFA is significantly reduced as compared with other algorithms, since the block size N is divided into multiplications, each of which has at least three stages.

In other words, $N^2$ multiplications are required in the conventional DCT calculation, whereas $N \times (N_1 + N_2 + N_3)$ multiplications are required in the present PFA, resulting in a significant reduction in the number of multiplications necessary to the DCT calculation. Also, because all of duplicated calculations and multiplications by "0" or "1" are deleted, the number of multiplications in the present PFA is much more reduced than those of other algorithms. Further, from $N \times (N_1 + N_2 + N_3)$, it can be seen that the number of multiplications in the present PFA is significantly reduced as compared with other algorithms as the block size N increases. That is, the more factors used, the fewer multiplications required.

Applying the mapping proposed by the above-mentioned algorithm recursively, at least four-dimensional mapping may be derived. In addition, a multi-dimensional PFA may be derived by using the summing formula of the trigonometric function.

However, the above-mentioned PFA has a disadvantage in that it can perform the DCT calculation only with respect to a block size N which is a multiplication of prime number such as 6 (1×2×3), 10 (1×2×5), 12 (1×3×4), 15 (1×3×5), . . . , 30 (2×3×5) and etc. For this reason, it is impossible to perform the calculation with respect to a block size 8 which is specified by MPEG as the International Standards Organization. The CFA is required to perform the calculation with respect to the block size 8.

The common factors mean the number having a common measure other than 1. For example, the three number 2, 2, 2 can be the common factors because the common measures thereof are 1 and 2.

In accordance with the present invention, the CFA is a DCT calculating algorithm for a block size N which is in the form of 8 (2×2×2), 16 (2×2×4), 32 (2×4×4), . . . and etc.

First, expand the block size N into a three-prime factor multiplication as follows:

$$N = N_1 \times N_2 \times N_3 \quad (20)$$

DCT and IDCT calculation expressions can be given by a DCT definition as follows:

$$X(n) = 2/N \cdot e(n) \sum_{k=0}^{N-1} x(k) \cdot \cos[\pi(2k+1)n/2N] \quad (21)$$

$n, k = 0, 1, \ldots, N - 1$ $$x(k) = \sum_{n=0}^{N-1} e(n) \cdot x(n) \cdot \cos[\pi(2k+1)n/2N] \quad (22)$$

$n, k = 0, 1, \ldots, N - 1$ where, $$e(n) = \begin{cases} 1/\sqrt{2}, & \text{if } n = 0 \\ 1, & \text{otherwise} \end{cases}$$

Here, the DCT and IDCT calculation expressions have the inverted relation to each other because of an orthogonal transform. The above algorithm is performed using the DCT calculation expression (21). A main feature of the above algorithm is to reduce the number of multiplications by expanding $\cos[\pi(2k+1)n/2N]$ as the DCT kernel as follows:

$$\cos[\pi(2k_1+1)n/2N_1] \times \cos[\pi(2k_2+1)n/2N_2] \times \cos[\pi(2k_3+1)n/2N_2N_3]$$

From this expression, it can be seen that the three-cosine multiplication in the CFA is different in a denominator from that in the PFA.

The above equation (21) is expanded into the following equation (23):

$$x(k_1, k_2, k_3) = \sum_{n_3=0}^{N_3-1} \sum_{n_2=0}^{N_2-1} \sum_{n_1=0}^{N_1-1} X(n_1, n_2, n_3) \cdot \quad (23)$$

$$\cos[\pi(2k_1+1)n_1/2N_1] \cdot \cos[\pi(2k_2+1)n_2/2N_2] \cdot \cos[\pi(2k_3+1)n_3/2N_2N_3]$$

for, $n_1, k_1 = 0, 1, 2, \ldots, N_1 - 1$
$n_2, k_2 = 0, 1, 2, \ldots, N_2 - 1$
$n_3, k_3 = 0, 1, 2, \ldots, N_3 - 1$ It can be seen that the above equation (23) is somewhat different in a denominator from the equation (4) in the PFA. This reason is because the PFA and CFA have different mapping substitutions.

Input mapping is performed to map one-dimensional input data $x(n)$ into three-dimensional input data $x(n_1, n_2, n_3)$, where, $x(n): n = 0, 1, \ldots, N - 1$ $x(n_1, n_2, n_3)$: $n_1 = 0, 1, 2, \ldots, N_1 - 1$ $n_2 = 0, 1, 2, \ldots, N_2 - 1$ $n_3 = 0, 1, 2, \ldots, N_3 - 1$ Similarly to that in the PFA, derivation of the equation (23) from the equation (21) is obtained by classifying the input mapping into the following four cases:

$$fa(n_1, n_2, n_3) = (n_2 N_3 N_1 + n_3 N_1 + n_1) \bmod N \text{ if} \quad (24)$$
$-3N < n_2 N_3 N_1 + n_3 N_1 + n_1 < -2N$
$\vdash 2N - (n_2 N_3 N_1 + n_3 N_1 + n_1)| \text{ if } -2N < n_2 N_3 N_1 + n_3 N_1 + n_1 < -N -$
$(n_2 N_3 N_1 + n_3 N_1 + n_1) \bmod N \text{ if } -N < n_2 N_3 N_1 + n_3 N_1 + n_1 < 0$
$n_2 N_3 N_1 + n_3 N_1 + n_1 \text{ if } n_2 N_3 N_1 + n_3 N_1 + n_1 < N$
$\vdash 2N - (n_2 N_3 N_1 + n_3 N_1 + n_1)| \text{ if } N < n_2 N_3 N_1 + n_3 N_1 + n_1 < 3N$ -continued $$fb(n_1,n_2,n_3) = (n_2N_3N_1 + n_3N_1 - n_1) \bmod N \text{ if}$$
$$-3N < n_2N_3N_1 + n_3N_1 - n_1 < -2N$$
$$|-2N - (n_2N_3N_1 + n_3N_1 - n_1)| \text{ if } -2N < n_2N_3N_1 + n_3N_1 - n_1 < -N -$$
$$(n_2N_3N_1 + n_3N_1 - n_1) \bmod N \text{ if } -N < n_2N_3N_1 + n_3N_1 - n_1 < 0$$
$$n_2N_3N_1 + n_3N_1 - n_1 \text{ if } n_2N_3N_1 + n_3N_1 - n_1 < N$$
$$|-2N - (n_2N_3N_1 + n_3N_1 - n_1)| \text{ if } N < n_2N_3N_1 + n_3N_1 - n_1 < 3N$$

$$fc(n_1,n_2,n_3) = (n_2N_3N_1 - n_3N_1 + n_1) \bmod N \text{ if}$$
$$-3N < n_2N_3N_1 - n_3N_1 + n_1 < -2N$$
$$|-2N - (n_2N_3N_1 - n_3N_1 + n_1)| \text{ if } -2N < n_2N_3N_1 - n_3N_1 + n_1 < -N -$$
$$(n_2N_3N_1 - n_3N_1 + n_1) \bmod N \text{ if } -N < n_2N_3N_1 - n_3N_1 + n_1 < 0$$
$$n_2N_3N_1 - n_3N_1 + n_1 \text{ if } n_2N_3N_1 - n_3N_1 + n_1 < N$$
$$|-2N - (n_2N_3N_1 - n_3N_1 + n_1)| \text{ if } N < n_2N_3N_1 - n_3N_1 + n_1 < 3N$$

$$fd(n_1,n_2,n_3) = (n_2N_3N_1 - n_3N_1 - n_1) \bmod N \text{ if}$$
$$-3N < n_2N_3N_1 - n_3N_1 - n_1 < -2N$$
$$|-2N - (n_2N_3N_1 - n_3N_1 - n_1)| \text{ if } -2N < n_2N_3N_1 - n_3N_1 - n_1 < -N -$$
$$(n_2N_3N_1 - n_3N_1 - n_1) \bmod N \text{ if } -N < n_2N_3N_1 - n_3N_1 - n_1 < 0$$
$$n_2N_3N_1 - n_3N_1 - n_1 \text{ if } n_2N_3N_1 - n_3N_1 - n_1 < N$$
$$|-2N - (n_2N_3N_1 - n_3N_1 - n_1)| \text{ if } N < n_2N_3N_1 - n_3N_1 - n_1 < 3N$$

Sets $\Omega a, \Omega b, \Omega c$ and $\Omega d$ of the n values calculated by the mapping functions fa, fb, fc and fd can be expressed by the following equations (25):

$$\Omega a = \{n/n = fa(n_1,n_2,n_3), n_1 \in \Omega 1, n_2 \in \Omega 2, n_3 \in \Omega 3\} \quad (25)$$
$$\Omega b = \{n/n = fb(n_1,n_2,n_3), n_1 \in \Omega 1, n_2 \in \Omega 2, n_3 \in \Omega 3\}$$
$$\Omega c = \{n/n = fc(n_1,n_2,n_3), n_1 \in \Omega 1, n_2 \in \Omega 2, n_3 \in \Omega 3\}$$
$$\Omega d = \{n/n = fd(n_1,n_2,n_3), n_1 \in \Omega 1, n_2 \in \Omega 2, n_3 \in \Omega 3\}$$

The union of the sets $\Omega a, \Omega b, \Omega c$ and $\Omega d$ is $4\Omega$. The union signifies merely gathering the elements in the sets. Namely, the union of a set $\{1,2,3\}$ and a set $\{3,4,5\}$ is the same as a set $\{1,2,3,3,4,5\}$. Further, the union of the sets means that each of the elements $0, 1, 2, \ldots, N-1$ is present by four therein.

With these mapping properties, the equation (21) can be expanded into the following equation (26) by dividing the DCT calculation for each mapping function by 4 and then summing the results:

$$X(k) = 1/4 \sum_{n=\Omega a} x(n) \cdot \cos[\pi(2k+1)n/2N] + \quad (26)$$

$$1/4 \sum_{n=\Omega b} x(n) \cdot \cos[\pi(2k+1)n/2N] +$$

$$1/4 \sum_{n=\Omega c} x(n) \cdot \cos[\pi(2k+1)n/2N] +$$

$$1/4 \sum_{n=\Omega d} x(n) \cdot \cos[\pi(2k+1)n/2N]$$

Also, the mapping inputs can be expressed using sign factors $s(n)$ which are different from those in the PFA, as follows:

$$x_a(n_1,n_2,n_3) = s_a(n)x(n)|n = fa(n_1,n_2,n_3) \quad (27)$$
$$x_b(n_1,n_2,n_3) = s_b(n)x(n)|n = fb(n_1,n_2,n_3)$$
$$x_c(n_1,n_2,n_3) = s_c(n)x(n)|n = fc(n_1,n_2,n_3)$$
$$x_d(n_1,n_2,n_3) = s_d(n)x(n)|n = fd(n_1,n_2,n_3)$$

for $$s_a(n) = \quad 1 \text{ if } -2N < n_2N_3N_1 + n_3N_1 + n_1 < -N$$
$$\text{or } N < n_2N_3N_1 + n_3N_1 + n_1 < 3N$$
$$-1 \text{ otherwise}$$

$$s_b(n) = \quad 1 \text{ if } -2N < n_2N_3N_1 + n_3N_1 - n_1 < -N$$
$$\text{or } N < n_2N_3N_1 + n_3N_1 - n_1 < 3N$$
$$-1 \text{ otherwise}$$

-continued $$s_c(n) = \quad 1 \text{ if } -2N < n_2N_3N_1 - n_3N_1 + n_1 < -N$$
$$\text{or } N < n_2N_3N_1 - n_3N_1 + n_1 < 3N$$
$$-1 \text{ otherwise}$$

$$s_d(n) = \quad 1 \text{ if } -2N < n_2N_3N_1 - n_3N_1 - n_1 < -N$$
$$\text{or } N < n_2N_3N_1 - n_3N_1 - n_1 < 3N$$
$$-1 \text{ otherwise}$$

Here, the minus sign appears because of the period functional property of cosine as follows:

$$\cos[\pi(2k+1)(2N-n)/2N] = -\cos[\pi(2k+1)n/2N] \quad (28)$$

The following equation (29) is obtained by substituting the four mapping functions $fa(n_1,n_2,n_3)$, $fb(n_1,n_2,n_3)$, $fc(n_1, n_2,n_3)$ and $fd(n_1,n_2,n_3)$ of the equation (27) for the n values in the equation (26):

$$X(k) = 1/4 \sum_{n_3=1}^{N_3-1} \sum_{n_2=1}^{N_2-1} \sum_{n_1=1}^{N_1-1} x_a(n_1,n_2,n_3) \times \cos[\pi(2k+1) \cdot \quad (29)$$

$$(n_2N_3N_1 + n_3N_1 + n_1)/2N] +$$
$$x_b(n_1,n_2,n_3) \times \cos[\pi(2k+1)(n_2N_3N_1 + n_3N_1 - n_1)/2N] +$$
$$x_c(n_1,n_2,n_3) \times \cos[\pi(2k+1)(n_2N_3N_1 - n_3N_1 + n_1)/2N] +$$
$$x_d(n_1,n_2,n_3) \times \cos[\pi(2k+1)(n_2N_3N_1 - n_3N_1 - n_1)/2N]$$

Here, all the mapping calculations with no correlation become 0 because the input values are not present. These can be expressed as follows:

$$\sum_{n_3=1}^{N_3-1} \sum_{n_2=1}^{N_2-1} \sum_{n_1=1}^{N_1-1} x_a(n_1,n_2,n_3) \times \cos[\pi(2k+1) \cdot \quad (30)$$

$$(n_2N_3N_1 + n_3N_1 - n_1)/2N] = 0$$

Namely, as stated previously in the PFA, the calculated result is 0 because the mapping function fa substituted for the n value has no correlation in the DCT calculations for the input functions fb, fc and fd. Similarly, the remaining terms become 0 on the same reason. The inputs in the equation (29) can be tied up by the equations (30) as shown in the following equation (31):

$$X(k) = 1/4 \sum_{n_3=1}^{N_3-1} \sum_{n_2=1}^{N_2-1} \sum_{n_1=1}^{N_1-1} x(n_1,n_2,n_3) \times \quad (31)$$

$$\{\cos[\pi(2k+1)(n_2N_3N_1 + n_3N_1 + n_1)/2N] +$$
$$\cos[\pi(2k+1)(n_2N_3N_1 + n_3N_1 - n_1)/2N] +$$
$$\cos[\pi(2k+1)(n_2N_3N_1 - n_3N_1 + n_1)/2N] +$$
$$\cos[\pi(2k+1)(n_2N_3N_1 - n_3N_1 - n_1)/2N]\}$$

Replacing a, b and c in the equation (13) in the PFA with $n_1$, $n_2N_3N_1$ and $n_3N_1$ respectively on the basis of the summing formula of the trigonometric function, the cosine term in the equation (30) can be transformed into the following three-cosine multiplication:

$$\cos[\pi(2k+1)(n_2N_3N_1 + n_3N_1 + n_1)/2N] + \quad (32)$$
$$\cos[\pi(2k+1)(n_2N_3N_1 + n_3N_1 - n_1)/2N] +$$
$$\cos[\pi(2k+1)(n_2N_3N_1 - n_3N_1 + n_1)/2N] +$$
$$\cos[\pi(2k+1)(n_2N_3N_1 - n_3N_1 - n_1)/2N]\} =$$
$$\cos[\pi(2k+1)n_1/2N_1] \times$$
$$\cos[\pi(2k+1)n_2/2N_2] \times \cos[\pi(2k+1)n_3/2N_2N_3]$$

Then, substituting the above equation (32) for the equation (31), the three-cosine multiplication can be derived as follows:

$$X(k) = \sum_{n_3=0}^{N_3-1} \sum_{n_2=0}^{N_2-1} \sum_{n_1=0}^{N_1-1} X(n_1,n_2,n_3) \cdot \quad (33)$$

$$\cos[\pi(2k+1)n_1/2N_1] \cdot \cos[\pi(2k+1)n_2/2N_2] \cdot \cos[\pi(2k+1)n_3/2N_2N_3]$$

for $n_1 = 0, 1, 2, \ldots, N_1 - 1$
$n_2 = 0, 1, 2, \ldots, N_2 - 1$
$n_3 = 0, 1, 2, \ldots, N_3 - 1$
$k = 0, 1, 2, \ldots, N - 1$ Output mapping is performed to map the three-dimensional output data x(k1,k2,k3) into the one-dimensional output data x(k). The output mapping can be expressed by the following equation (34):

$$\begin{aligned} k_1 &= k_a \\ k_2 &= k_b && \text{if } k_b < N_2 \\ 2N_2 - 1 - k_b && \text{if } N_2 <= K_b < 2N_2 \\ k_3 &= k_c && \text{if } k_c < N_3 \\ \left| \begin{array}{l} 2N_3 - 1 - k_c \\ 3N_3 - 1 - k_c \end{array} \right| && \begin{array}{l} \text{if } N_3 <= K_c < 2N_3 \\ \text{if } 2N_3 <= K_c < 3N_3 \end{array} \end{aligned} \quad (34)$$

where, $k_a = k \text{ modulo } N_1$
$k_b = k \text{ modulo } 2N_2$
$k_c = k \text{ modulo } 3N_3$ Substituting the output mapping values $k_1$, $k_2$ and $k_3$ in the above equations (34) for k, the result is:

$$\begin{aligned} \cos[\pi(2k+1)n_1/2N_1] &= \cos[\pi(2k_1+1)n_1/2N_1] \\ \cos[\pi(2k+1)n_2/2N_2] &= \cos[\pi(2k_2+1)n_2/2N_2] \\ \cos[\pi(2k+1)n_3/2N_2N_3] &= \cos[\pi(2k_3+1)n_3/2N_2N_3] \end{aligned} \quad (35)$$

With the above result, the three-dimensional CFA result (36) proposed by the present invention can be derived from the equation (21):

$$X(k) = \sum_{n_3=0}^{N_3-1} \sum_{n_2=0}^{N_2-1} \sum_{n_1=0}^{N_1-1} X(n_1,n_2,n_3) \cdot \quad (36)$$

$$\cos[\pi(2k_1+1)n_1/2N_1] \cdot \cos[\pi(2k_2+1)n_2/2N_2] \cdot \cos[\pi(2k_3+1)n_3/2N_2N_3]$$

for $n_1 = 0, 1, 2, \ldots, N_1 - 1$
$n_2 = 0, 1, 2, \ldots, N_2 - 1$
$n_3 = 0, 1, 2, \ldots, N_3 - 1$
$k_1 = 0, 1, 2, \ldots, N_1 - 1$
$k_2 = 0, 1, 2, \ldots, N_2 - 1$
$k_3 = 0, 1, 2, \ldots, N_3 - 1$ FIG. 2A is a view illustrating an input mapping table for the CFA in the case where the block size N is 8 (2×2×2). In this drawing, the mapped values are obtained by substituting the variables $n_1$ (0,1), $n_2$ (0,1) and $n_3$ (0,1) for the four mapping functions fa, fb, fc and fd of the equations (24). In the union of the mapped values, each of the elements 0, 1, 2, 3, . . . 8 is present by four, similarly to that in the PFA.

FIG. 2B is a view illustrating an output mapping table for the CFA in the case where the block size N is 8 (2×2×2). In this drawing, the mapped values are obtained by substituting the output variables $k_1$ (0,1), $k_2$ (0,1) and $k_3$ (0,1) for the output mapping functions of the equations (34). The output sequences are rearranged as shown in FIG. 2B.

FIG. 2C is a view illustrating a signal flow graph for the input mapping of the CFA and FIG. 2D is a view illustrating a signal flow graph for the output mapping of the CFA. In the case where the block size N is 8, the one-dimensional input data [X(0)–X(7)] is mapped into the three-dimensional input data [X(0,0,0)–X(1,1,1)] as shown in FIG. 2C and the calculated result is mapped into the compressed final output data [X(0)–X(7)] as shown in FIG. 2D.

Figure 3:
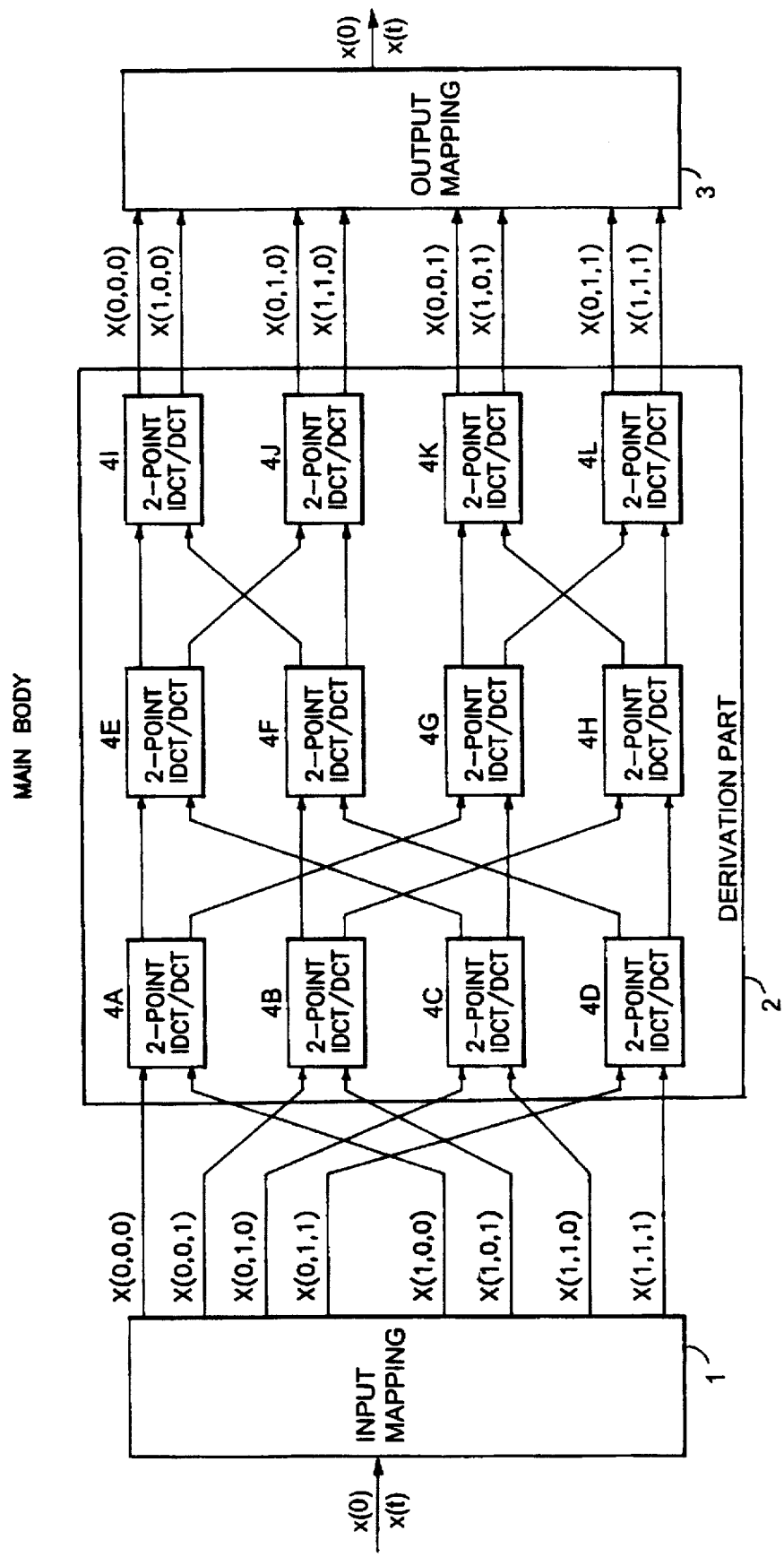
FIG. 3 is a view illustrating a signal flow graph for the process of the CFA.

FIG. 3 is a view illustrating a signal flow graph for the process of the CFA. In the case where the block size N is 8, 12 2-point DCTs are required in the DCT calculation. In this case, 12 multiplications are necessary because each DCT requires one multiplication. An input mapping part 1 is provided to map the one-dimensional input data into the three-dimensional input data. A derivation part 2 is provided to derive the three-dimensional DCT calculation expression from the one-dimensional DCT calculation expression. An output mapping part 3 is provided to map the expanded three-dimensional data into the compressed final output data. Data in a time domain, i.e., x(0), . . . , x(t), are necessary in input mapping part (1) shown in FIG. 3, and data in a frequency comain, i.e., x(0) . . . , x(t), are necessary in output mapping part (3) in FIG. 3.

The derivation part 2 includes 12 2-point DCTS 4A–4L. In the case where the DCT calculation is to be performed by the CFA, the number of multiplications of $N_1$-point to $N_3$-point DCTs is $(N/2) \times \log 2^N$. The number of multiplications required in the CFA can be calculated in the below manner:

(the number of multiplications for $N_1$ – point $DCT$) × $N_2N_3$ +
(the number of multiplications for $N_2$ – point $DCT$) × $N_1N_3$ +
(the number of multiplications for $N_3$ – point $DCT$) × $N_1N_2$
The number of multiplications = $\{(N_1/2) \times \log 2^{N_1}\} \times (N_2 \times N_3)$ +
$\{(N_2/2) \times \log 2^{N_2}\} \times (N_1 \times N_3) + \{(N_3/2) \times \log 2^{N_3}\} \times$
$(N_1 \times N_2) = (N/2) \times \log 2^N$ For example, if $N = 8(2 \times 2 \times 2)$,
  $\{(2/2) \times \log 2^2\} \times (2 \times 2) +$
  $\{(2/2) \times \log 2^2\} \times (2 \times 2) +$
  $\{(2/2) \times \log 2^2\} \times (2 \times 2) = 12 = (8/2)\log 2^8$
if $N = 16(2 \times 2 \times 4)$,
  $\{(2/2) \times \log 2^2\} \times (2 \times 4) +$
  $\{(2/2) \times \log 2^2\} \times (2 \times 4) +$
  $\{(4/2) \times \log 2^4\} \times (2 \times 2) = 32 = (16/2)\log 2^{16}$
if $N = 32(2 \times 4 \times 4)$,
  $\{(2/2) \times \log 2^2\} \times (4 \times 4) +$
  $\{(4/2) \times \log 2^4\} \times (2 \times 4) +$
  $\{(4/2) \times \log 2^4\} \times (2 \times 4) = 80 = (32/2)\log 2^{32}$
if $N = 64(4 \times 4 \times 4)$,
  $\{(4/2) \times \log 2^4\} \times (4 \times 4) +$
  $\{(4/2) \times \log 2^4\} \times (4 \times 4) +$
  $\{(4/2) \times \log 2^4\} \times (4 \times 4) = 192 = (64/2)\log 2^{64}$ Therefore, the above-mentioned three-dimensional CFA can perform the calculation with respect to the block size 8 which is specified by MPEG as the International Standards Organization. In the same manner as that in the PFA, in the case where the block size N is large, the number of multiplications in the present CFA is significantly reduced as compared with other algorithms, since the block size N is divided into multiplications, each of which has at least three stages.

As apparent from the above description, according to the present invention, the number of multiplications is significantly reduced as compared with the two-dimensional algorithm, resulting in an increase in the DCT calculation speed. This has the effect of increasing the reliability of the video compression performance. Also, a smaller number of multipliers and adders can be used in the implementation of a hardware. Therefore, a chip area can be reduced in the circuit integration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video data processing method for compressing a one dimensional input video signal, comprising the steps of:

modifying the one dimensional input video data signal by input mapping the input video data signal to produce a three dimensional input video data signal, wherein the input video signal has a block size which is a multiplication of three prime factors, and wherein said input mapping is performed to make said three dimensional input video signal a function of said three prime factors and said one dimensional input video data signal;

compressing said three dimensional input video data signal by calculating a discrete cosine transform correlated with said three prime factors; and further modifying the compressed three dimensional input video data signal by output mapping the compressed three dimensional output video data signal to produce a compressed one dimensional output video data signal, wherein said output mapping is performed to make said compressed one dimensional output video data signal a function of said three prime factors and said compressed three dimensional output video data signal.

2. A video data processing method for compressing a one dimensional input video data signal, the method comprising the steps of:

modifying the one dimensional input video data signal by input mapping the input video data signal to produce a three dimensional input video data signal, wherein the input video signal has a block size which is a multiplication of three common factors, and wherein said input mapping is performed to make said three dimensional input video signal a function of said three common factors and said one dimensional input video data signal;

compressing said three dimensional input video data signal by using a calculation of a discrete cosine transform correlated with said three common factors; and further modifying said compressed three dimensional input video data signal by output mapping the compressed three dimensional output video data signal to produce a compressed one dimensional output video data signal, wherein said output mapping is performed to make said compressed one dimensional output video data signal a function of said three common factors and said compressed three dimensional output video data signal.

* * * * *